United States Patent [19]

Gardi et al.

[11] 3,912,768

[45] Oct. 14, 1975

[54] NORETHINDRONE O-ALKYLOXIMES

[75] Inventors: Rinaldo Gardi, Carate Brianza; Romano Vitali, Monza; Giovanni Falconi, Milan, all of Italy

[73] Assignee: Warner-Lambert Company, Morris Plains, N.J.

[22] Filed: Sept. 17, 1973

[21] Appl. No.: 398,114

[30] Foreign Application Priority Data

Sept. 26, 1972 Italy.................................. 29677/72

[52] U.S. Cl. ............ 260/397.5; 260/397.4; 424/243
[51] Int. Cl.²................................................... C07J
[58] Field of Search................................. 260/397.5

[56] References Cited
UNITED STATES PATENTS

| | | | |
|---|---|---|---|
| 3,299,107 | 1/1967 | Mazur............................. | 260/397.5 |
| 3,507,888 | 4/1970 | Klimstra........................... | 260/397.3 |
| 3,629,304 | 12/1971 | Baran et al. ..................... | 260/397.5 |
| 3,658,855 | 4/1972 | Kruger et al..................... | 260/397.5 |
| 3,780,073 | 12/1973 | Shroff............................. | 260/397.5 |
| 3,862,193 | 1/1975 | Hirsch............................. | 260/397.5 |

OTHER PUBLICATIONS

Kirk et al., Steroid Reaction Mechanisms, p. 343, (1968).

*Primary Examiner*—Elbert L. Roberts
*Attorney, Agent, or Firm*—Albert H. Graddis; Frank S. Chow; Anne M. Kelly

[57] ABSTRACT

O-alkyloximes of norethindrone and their "anti" and "syn" isomers have prolonged oral contraceptive activity at low doses and are equally efficacious when administered before copulation or after coition. A particularly useful compound is the anti isomer of the 3-cyclopentyloxime of norethindrone.

16 Claims, No Drawings

NORETHINDRONE O-ALKYLOXIMES

BACKGROUND OF THE INVENTION

The need for compounds having a high degree of contraceptive activity is well known. It is particularly desirable to provide such compounds which have post-coital, long-lasting effects and which are orally active at low doses.

The 3-oximes and N-acyloximes of norethindrone are known to have contraceptive properties. According to U.S. Pat. No. 3,532,689, these compounds are effective as post-coital agents when given orally at dose levels of 5–10 mg/kg. When used precoitally, they are able to suppress reproduction in female animals if administered to both males and females daily and continuously, before and during the period they are cohabiting. The compounds of the prior art have, however, a short effect and their inhibiting action ends when treatment is interrupted.

The present invention provides novel O-alkyloximes of norethindrone and their anti and syn isomers which have a considerably long duration of action and are pre- and post-coitally actine at low doses.

SUMMARY AND DETAILED DESCRIPTION

The present invention relates to novel O-alkyloximes of norethindrone ($17\alpha$-ethynyl-19-nortestosterone) and to methods for their preparation. The invention also relates to pharmaceutical compositions containing such compounds, particularly under the form of anti or syn isomers, in admixture with pharmaceutically acceptable carriers, and to a method of using said compounds as antifertility agents for oral or parenteral administration in animals and women.

The new ether oximes of this invention have the following formula:

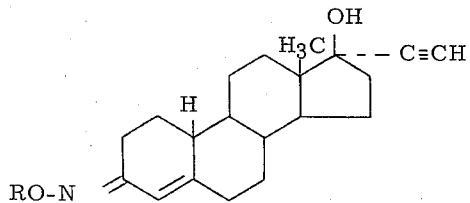

I wherein R represents a saturated or mono-unsaturated open-chain aliphatic hydrocarbon radical or a cyclic aliphatic hydrocarbon radical containing up to 9 carbon atoms inclusive. Typical radicals are: methyl, ethyl, propyl, butyl, pentyl, heptyl, nonyl and their isomers, propargyl ($CH\equiv C-CH_2-$), cyclopropyl, cyclobutyl, cyclopentyl, cycloheptyl and cyclooctyl.

Due to the geometric asymmetry resulting from the double bond joining the steroid nucleus with the alkoxyimino group, the compounds of this invention can exist under two stereoisomer forms which have been identified as the anti and the syn form. Derivatives of the two series are distinguished by their different melting points, as well as by their different polarity. The anti isomers are less polar and show a less positive molecular rotation than corresponding stereoisomers of the syn series.

It is understood that the scope of present invention includes both anti and syn isomers in pure form of the O-alkyloximes of formula I, as well as mixtures of said isomers in any proportion whatsoever. Preferred compounds are the anti and syn isomers of norethindrone 3-methyloxime, -propyloxime, -propargloxime, -pentyloxime, -heptyloxime and -cyclopentyloxime as well as the syn isomers of norethindrone 3-ethyloxime, butyloxime and nonyloxime. A particularly preferred compound is the anti isomer of the 3-cyclopentyloxime.

It has been found that the O-alkyloximes of formula I, and particularly the syn and anti isomers defined above, have a strengthened and prolonged contraceptive activity as compared to prior art compounds. Due to their increased action, the novel norethindrone O-alkyloximes may totally suppress reproduction at remarkably smaller doses than usually required with the already-known 3-oxime and corresponding N-acetyloxime. Further, they exhibit a long-lasting action, so that their effectiveness as contraceptive agents is not exhausted with interruption of the treatment, but remains protracted for a certain period of time. The new compounds of this invention thus offer a lasting protection to the females of treated animals, preventing their pregnancy even when the treatment is cut off.

This protraction of effect is particularly evident when the compounds are orally administered. One single oral dose of the compounds of this invention, given to female rats before copulation, is able to prevent implantation and therefore pregnancy, even though several days have elapsed since administration. So, for instance, the 3-cyclopentyloxime of norethindrone (anti isomer) given orally in one single dose of about 2 mg to female rats before copulation, shows a contraceptive effect which lasts more than 10 days. The same compound administered in one single dose of about 2 mg/Kg to female rats between the 34th and 50th hour after cotion, totally prevents pregnancy.

The compounds of the present invention therefore show a high post-coitum effect at a low dosage. Though the 3-cyclopentyloxime is extraordinarily active on female rats it has no effect whatsoever on fertility when given to male rats. By contrast, the well-known 3-oxime shows, instead, a remarkable anti-fertility action on male rats too, thus being similar in activity to norethindrone.

The 3-cyclopentyloxime also shows, when compared to the corresponding 3-oxime, other improved properties. It possesses a noticeable, prolonged anti-estrogen action and a remarkable anti-estral activity. In fact, even when given in a single oral dose, it can produce discontinuances or reductions in the estral cycle of female animals. When compared to the free 3-oxime, the 3-cyclopentyloxime shows a more remarkable and presistent uterotrophic activity and exerts a more intensive ovaric inhibition.

The O-alkyloximes of norethindrone, therefore, differ in their biological profile from similar derivatives already proposed as oral contraceptives. Their superior activity seems to be due to the simultaneous presence of an alkyl or cycloalkyl ether group in 3-position and f the free hydroxy group in $17\beta$-position. It has been, in fact, noted that the esterification of this 17-hydroxy group in the derivatives of formula I causes an unexpected decrease of contraceptive activity and a lowering of the protracted effect. For instance, the 17-acetate of norethindrone 3-cyclopentyloxime shows a reduced action in comparison with the corresponding cyclopentyloxime of norethindrone free alcohol. However, the 17-enanthate of norethindrone 3- cyclopentyloxime seems to possess a protracted effect which is slightly inferior to the corresponding cyclic derivative having the alcoholic function free.

The new norethindrone O-alkyloximes being active as oral, low-dosage, long-lasting contraceptives can be advantageously used pre- and post-coitally, to prevent and block conception in female animals and women.

The pharmaceutical preparations of this invention are employed in dosage forms which contain the active O-alkyloxime, and particularly the O1cyclopentyloxime of norethindrone, in admixture with a liquid or a solid, pharmaceutically acceptable carrier. This carrier may be selected from those usually employed in the pharmaceutical practice, such as a vegetable oil and specifically seasame oil, lactose, starch, magnesium stearate and the like. Oral compositions can be administered, as a rule, in the form of coated tablets, pills, sugar-Coated tablets, pastilles, capsules or as solutions or suspensions which can be administered in drops.

The subject compounds are included in the compositions of this invention in an amount sufficient to produce the desired anti-fertility effect, that is to prevent conception and to inhibit pregnancy. In general, these compositions contain the active steroid in an amount of from 0.002 mg/Kg to about 2 mg/Kg, and preferably from about 0.01 mg/Kg to about 1 mg/Kg.

The method of this invention consists in administering, particularly by oral route, an effective amount of norethindrone O-alkyloxime to prevent pregnancy. The fertility inhibiting dose, as defined above, is given pre-coitally at weekly or fortnightly intervals. For post-coital effects the O-alkyloxime and especially the 3-cyclopentyloxime of norethindrone is given orally at dose levels of from 0.01 to 1 mg/Kg on 2 and 3 after coition, preferably in one single dose.

The compounds of the present invention can be prepared by any conventional method. Usually they are obtained by reaction of norethindrone (17α-ethynyl-19-northestosterone) with an acid addition salt of the appropriate alkoxyamine under basic conditions and, preferably, in the presence of pyridine. As a salt of alkoxyamine, the hydrochloride is generally preferred, but other salts can equally be used, such as hydrobromide, hydroiodide, acetate and the like.

Alkoxyamines which are the necessary reactants for the synthesis of the oxime ethers of the invention can be easily prepared by the Fuller and King method (J. Chem. Soc. 1947,963), by reacting an alkyl halide with N-oxyurethane and treating the intermediate alkyloxyurethane thus formed with an alkaline hydrate to obtain the corresponding alkyloxime which is separated and purified under the form of an acid addition salt, such as, for instance, the hydrochloride.

Alternatively, the compounds of this invention can be obtained by O-alkylation of the 3-oxime of norethindrone with an appropriate alkylating agent, i.e. a saturated or unsaturated alkyl halide or cycloalkyl halide, such as a bromide or chloride, in the presence of an alkaline metal alcoholate as a condensing agent, such as for instance sodium ethylate. This alternate method can be usefully employed for preparing norethindrone 3-propargyloxime, by condensing the preformed norethindrone 3-oxime with 1-bromo-2-propyne in the presence of sodium ethylate.

The syn and anti isomers of this invention may be easily obtained by sudmitting the resulting O-alkyloximes of norethindrone to fractional crystallization from appropriate solvents or, preferably, to chromatographic separation on aluminium oxide, according to well-known techniques.

The following examples are given for the purpose of illustrating the chemical preparation and the biological activity of the compounds of this invention.

PREPARATION OF ALKOXYAMINES HYDROCHLORIDES

This preparation illustrates the general procedure which has been followed in preparing reactants necessary for the synthesis of steroid O-alkyloximes. The method employed therein is substantially the one described by Fuller and King (J. Chem. Soc. 1947,963), to which only minor procedural changes were made.

For the preparation of cyclopentyloxyamine hydrochloride the following technique was applied:

A solution of 11.8 g of potassium hydroxide in 118 ml of ethanol, containing 21 g of N-hydroxyurethane and 33 g of cyclopentyl bromide, was refluxed during 5 hours. Then, the solvent was removed in vacuo and the residue taken up with water. The aqueous layer was thoroughly extracted with ether, and the organic extracts were collected and dried over anhydrous sodium sulphate. By evaporation of the solvent, an oil was obtained consisting of 22 g of cyclopentyloxyurethane which was treated to boiling for about an hour with 28.5 g of potassium hydroxide in 57 ml of water. At the end of the heating, the cyclopentyloxyamine which was separated as a supernatant oily layer was extracted with sulphuric ether. The collected ether extracts were previously dried over anhydrous sodium sulphate and then a stream of anhydrous gaseous hydrochloric acid was bubbled through them. The crystalline material which quickly separated was filtered, washed with ether and then recrystallized from ethyl acetate. Thus, 16 g of cyclopentyloxyamine hydrochloride, melting at 178°–179°C were obtained.

The same procedure was applied for the preparation of other desired alkoxyamines by using the appropriate alkyl halide instead of the cyclopentyl hydrobromide.

EXAMPLE 1

A solution of 4 g of 17β-hydroxy-19-nor-17α-pregn-4-en-20-yn-3-one (norethindrone) in 40 ml of pyridine was treated with 3.1 g of cyclopentyloxyamine hydrochloride.

The reaction mixture was heated on a boiling water bath for 1 hour and then poured, after cooling, into a large excess of ice and water. The solid which separated was collected by filtration, thoroughly washed with water and air-dried. The product consisted of 3-cyclopentyloxyimino-19-nor-17α-pregn-4-en-20-yn-17β-ol, as a mixture of two isomers.

By operating in a similar way, other O-alkyloximes of norethindrone were obtained, including 3-methyloxime, 3-ethyloxime, 3-n. propyloxime, 3-i. propyloxime, 3-n. butyloxime, 3-i. butyloxime, 3-n. amyloxime, 3-i. amyloxime, 3-n. heptyloxime, 3-i. heptyloxime, 3-n. nonyloxime, 3-i. nonyloxime, 3-cyclopropyloxime, 3-cyclobutyloxime, 3-cycloheptyloxime, and 3-cycloctyloxime.

The following example illustrates the generally-followed procedure for resolving the resulting isomeric mixtures in order to obtain the pure anti and syn isomers of said alkoxyimino derivatives.

EXAMPLE 2

3-Cyclopentyloxyimino-19-nor-17α-pregn-4-en-20-yn-17β-ol (or norethindrone 3-cyclopentyloxime), obtained as described in Example 1, was column-chromatographed over 200 g of alumina (activity II – III according to Sthal) and continuously eluted with petroleum ether (b.p. 40°–60°C).

The first eluted fractions contained the anti isomer in a nearly pure form. By continuing elution, the anti isomer gradually decreased while the percentage of the syn isomer increased. The last eluted fractions contained only the syn isomer in a nearly pure form. Fractions containing the two pure isomers were separately collected and recrystallized from ethyl etherpetroleum ether to give respectively crystals of syn and anti isomers, both homogeneous on plate chromatography.

The chemical-physical characteristics and molecular rotations of the anti and syn isomers of 3-cyclopentyloxime are the following:

anti isomer : m.p. 134°–137°; $[\alpha]_D + 2.2°$ (dioxane 1%); $\lambda_{max}252$ m$\mu$; $E_1^{1\%} = 610$;

syn isomer : m.p. 114°–118°; $[\alpha]_D + 130.6°$ (dioxane 1%); $\lambda_{max}259$ m$\mu$; $E_{1cm}^{1\%} = 400$.

Hereinafter there are reported the physical data (melting point, molecular rotation in dioxane and spectroscopic value) of the anti and syn isomers of other norethindrone O-alkyloximes.

3-Methyloxime —
anti isomer : m.p. 136°–138°; $[\alpha]_D + 13.6°$; $\lambda_{max}249$ m$\mu$; $E_{1cm}^{1\%} = 667$;
syn isomer : m.p. 148°–152°; $[\alpha]_D + 110.3°$; $\lambda_{max}256$ m$\mu$; $E_{1cm}^{1\%} = 461$;

3-Ethyloxime —
anti isomer : m.p. 110°–113°; $[\alpha]_D + 8°$; $\lambda_{max}250$ m$\mu$; $E_{1cm}^{1\%} = 656$;
syn isomer : m.p. 139°–143°; $[\alpha]_D + 115.2°$; $\lambda_{max}257$–258 m$\mu$; $E_{1cm}^{1\%} = 434$;

3-n. Propyloxime —
anti isomer : m.p. 112°–113°; $[\alpha]_D + 11.4°$; $\lambda_{max}250$ m$\mu$; $E_{1cm}^{1\%} = 668$;
syn isomer : m.p. 83°–86°; $[\alpha]_D + 110°$; $\lambda_{max}255$–256 m$\mu$; $E_{1cm}^{1\%} = 402$;

3-n. Butyloxime —
anti isomer : m.p. 119°–120°; $[\alpha]_D + 10°$; $\lambda_{max}250$ m$\mu$; $E_{1cm}^{1\%} = 632$.

A mixture of 3-butyloxime containing 60% syn isomer and 40% anti isomer showed: m.p. 114°–128°; $[\alpha]_D + 71°$; $\lambda_{max}251$–252 m$\mu$; $E_{1cm}^{1\%} = 493$;

3.-n. Pentyloxime —
anti isomer : m.p. 75°–76°; $[\alpha]_D + 8.5°$; $\lambda_{max}250$ m$\mu$; $E_{1cm}^{1\%} = 623$;
syn isomer (containing about 20% anti isomer): m.p. 99°–103°; $[\alpha]_D + 97°$; $\lambda_{max}254$–255 m$\mu$; $E_{1cm}^{1\%} = 427$.

3-n. Heptyloxime -
anti isomer (containing about 5% syn isomer): oil; $[\alpha]_D + 14.3°$; $\lambda_{max}250$ m$\mu$; $E_{1cm}^{1\%} = 538$;
syn isomer : m.p. 104°–106°; $[\alpha]_D + 108.5°$; $\lambda_{max}257$ m$\mu$; $E_{1cm}^{1\%} = 383$.

3-Cycloheptyloxime —
anti isomer : m.p. 143°–145°; $[\alpha]_D + 8°$; $\lambda_{max}250$ m$\mu$; $E_{1cm}^{1\%} = 557$;
syn isomer : m.p. 154°–155°; $[\alpha]_D + 123.7°$; $\lambda_{max}260$ m$\mu$; $E_{1cm}^{1\%} = 368$.

3-n. Nonyloxime —
anti isomer : oil, $[\alpha]_D + 8.5°$; $\lambda_{max}250$ m$\mu$; $E_{1cm}^{1\%} = 480$;
syn isomer : m.p. 80°–82°; $[\alpha]_D + 102°$; $\lambda_{max}258$ m$\mu$; $E_{1cm}^{1\%} = 351$.

EXAMPLE 3

To a solution containing 255 mg of sodium in 34.5 ml of absolute ethanol there were added 3.45 g of 3-oxyimino-19-nor-17α-pregn-4-en-20-yn-17β-ol (norethindrone 3-oxime). The mixture was treated with 0.9 ml of 1-bromo-2-propyne and then vigorously agitated for 5 hours. After evaporation of the solvent at reduced pressure the residue was treated twice with 50 ml of ether, the material which did not dissolve into this solvent being removed through filtration. The filtered solution was evaporated to dry and the residue crystallized from ethyl ether-petroleum ether to give 3-(prop-2′-ynyl-oximino)-19-nor-17α-pregn-4-en-20-yn-17β-ol, as a mixture of anti and syn isomers. The product showed $[\alpha]_D + 15°$ (dioxane 1%); $\lambda_{max}245$ m$\mu(\epsilon22.800)$.

Resolution of norethindrone 3-propargyloxime into the pure anti and syn isomers was obtained through chromatography on aluminum hydroxide. By elution with ethyl ether-petroleum ether, followed by recrystallization from the same solvents, the anti isomer was obtained in pure form, at m.p. 113°–114°C; $[\alpha]_D + 13°$ (dioxane 1%); $\lambda_{max}246$–247 m$\mu$; $E_{1cm}^{1\%} = 661$.

EXAMPLE 4

By operating as described in Example 1 and using instead of norethindrone free alcohol the corresponding 17-enanthate, 3-cyclopentyloxyimino-19-nor-17α-pregn-4-en-20-yn-17β-ol enanthate (or norethindrone enanthate 3-cyclopentyloxime) was obtained, at a m.p. 80°–82°C; $[\alpha]_D + 38°$ (dioxane 1%); $\lambda_{max}251$ m$\mu$; $E_{1cm}^{1\%} = 416$. The same compound was also prepared by submitting the 3-cyclopentyloxime of norethindrone to esterification with enanthic anhydride in the presence of pyridine at room temperature.

EXAMPLE 5

Biological assays:

In order to ascertain and evaluate the pre- and post-coital contraceptive effect of the O-alkyloximes of this invention, the following biological assays were carried out:

1st Experiment: Female rats of the Wistar strain weighing about 170 g were used. Compounds under examination were daily administered to the animals by oral route, either with their food or by gavage, and the oral treatment was continued for a 3 weeks' period. Each compound was administered to a group of 10 animals while another group of the same number of animals was kept as control and did not receive any compound.

The day after the beginning of treatment, fertile male rats were introduced into the cages and allowed to cohabit with the females until the latter became pregnant. When pregnancy was ascertained, administration of the compound under examination was discontinued and the animal was segregated and allowed to spontaneously litter.

Observation was protracted even after the end of the treatment period until all animals had littered. The number of female rats who became pregnant during treatment with the compounds under examination and the number of animals whose pregnancy started in the period after treatment discontinuance were evaluated.

In the last case, for each group of treated animals, the average period intervening between treatment discontinuance and parturition was calculated. The length of the contraceptive effect for each compound under examination was calculated by subtracting the normal pregnancy period of the controls from the average pregancy period of the treated animals.

In Table I are given the results obtained with some of the most representative compounds of this invention in comparison with the already known 3-oxime of norethindrone acetate and the corresponding 3-cyclopentyl enolether. These results indicate that the well-known 3-oxime of norethindrone acetate, at the dose used, is able to inhibit pregnancy in 50% of treated animals only, while the tested O-alkyloximes, administered at equivalent doses, prevent conception in all or about all the treated animals during the entire treatment period and maintain their effect for a certain time even after treatment discontinuance, thus postponing the pregnancy by several days. Contraceptive activity is particularly evident in the case of norethindrone 3-cyclopentyloxime while the corresponding 3-cyclopentyl enolether of norethindrone acetate is not able to prevent pregnancy even when administered at more than double dose.

contraceptive effect for each compound. The results of this experiment, reported in Table II, indicate that norethindrone O-alkyloximes possess a prolonged contraceptive effect since they maintain their effectiveness for many days after administration. A single oral dose of the tested compounds can prevent for some time formation of implantation and thus delay pregnancy. This prolongation of effect is particularly evident in the case of 3-cyclopentyl-, 3-methyl- and 3-pentyl (or amyl) derivatives. It appears that the anti isomers of 3-cyclopentyl- and 3-pentyloxime are generally more effective than the corresponding syn forms, while in the case of 3-methyloxime it is the syn isomer which seems more active.

From the results of Table II we can also observe that the O-alkyloximes of norethindrone are particularly active when the alcoholic function of the steroid (represented by the tertiary 17-hydroxy group) is free. The activity is considerably reduced, when the alcoholic function is esterified, as shown by the comparison between 3-cyclopentyloximes of free norethindrone and of norethindrone acetate (first and last-but-one compound of the Table).

It should be finally noted that, unlike the novel O-

TABLE I

| Compound administered (3-weeks oral treatment) | Daily dose | | No of pregnant female rats out of 10 treated | | Duration of contraceptive action B |
|---|---|---|---|---|---|
| | μmoles | mg | A | B | Average no. of days |
| Norethindrone 3-cyclopentyloxime (anti isomer) | 0.2 | 0.0764 | — | 10 | 9.5 |
| Norethindrone 3-n.pentyloxime (anti isomer) | 0.2 | 0.0768 | 1 | 9 | 6.5 |
| Norethindrone 3-methyloxime (anti isomer) | 0.2 | 0.0654 | 2 | 8 | 5 |
| Norethindrone 3-methyloxime (syn isomer) | 0.2 | 0.0654 | — | 10 | 6.5 |
| Norethindrone 3-propargyloxime (anti isomer) | 0.2 | 0.0702 | — | 10 | 5 |
| Norethindrone 17-acetate 3-oxime | 0.2 | 0.0710 | 5 | 5 | 0 |
| Norethindrone 17-acetate 3-cyclopentyl enol ether | 0.5 | 0.2045 | 10 | — | — |

A = during treatment
B = after treatment discontinuance

2nd Experiment: This experiment was carried out by using the same procedure as described above, with the exception that the test compounds were given to female rats in a single, oral dose (instead of a daily dose), dissolved into 0.2 ml of sesame oil. Each compound under examination was evaluated on 10 animals while a group of as many animals, to whom no compound was administered, served for control purpose. The day after treatment, the treated and untreated females were allowed to cohabit with fertile male rats until the females became pregnant. The trial served to establish the average period of days intervening between introduction of males and parturition both in the control group and in each of the groups of animals who were treated with the compounds under examination. By difference from the normal period of the controls it was possible to calculate the period in days of pregnancy postponement in treated animals and thus evaluate the duration of alkyloximes of this invention, the well-known 3-oximes of free norethindrone and of corresponding 17-acetate have an oral activity which is relatively short, lasting only 1 or 2 days maximum, from administration. Also the well-known norethindrone acetate 3-cyclopentyl enolether shows only a slight prolongation of contraceptive effect.

The duration of the pre-mating contraceptive effect can also be quickly determined by administering the compounds of this invention by oral route, as usual, in a single, equimolar dose to female rats on the day preceding cohabitation with male rats, and afterwards ascertaining pregnancy by palpation in the control group, and in each group of the treated animals on 15th day from the treatment.

The data reported in Table III confirm that norethindrone O-alkyloximes have a long-lasting oral contraceptive effect.

TABLE II

| Compound administered orally (in 0.2 ml sesame oil) | Single pre-mating dose μmoles | Single pre-mating dose mg | Duration of contraceptive effect Average no. of days |
|---|---|---|---|
| Norethindrone 3-cyclopentyloxime (anti isomer) | 5 | 1.910 | 11 |
|  | 10 | 3.820 | 12 |
| Norethindrone 3-cyclopentyloxime (syn isomer) | 10 | 3.820 | 8 |
| Norethindrone 3-methyloxime (anti isomer) | 5 | 1.635 | 6 |
| Norethindrone 3-methyloxime (syn isomer) | 5 | 1.635 | 8 |
| Norethindrone 3-propargyloxime (anti isomer) | 5 | 1.755 | 4.5 |
| Norethindrone 3-n.pentyloxime (syn isomer) | 5 | 1.920 | 6 |
| Norethindrone 3-n.pentyloxime (anti isomer) | 5 | 1.920 | 8 |
|  | 10 | 3.840 | 11 |
| Norethindrone 3-n.heptyloxime (anti isomer) | 10 | 4.120 | 8 |
| Norethindrone 3-n.nonyloxime (syn isomer) | 10 | 4.400 | 6.5 |
| Norethindrone 3-oxime | 5 | 1.565 | 0 |
| Norethindrone 17-acetate 3-oxime | 5 | 1.775 | 1 |
|  | 10 | 3.550 | 2 |
| Norethindrone 17-acetate 3-cyclopentyloxime | 10 | 4.090 | 3 |
| Norethindrone 17-acetate 3-cyclopentyl enolether | 10 | 4.240 | 2.5 |

TABLE III

| Compound administered orally (in 0.2 ml sesame oil) | Single pre-mating dose μmoles | Single pre-mating dose mg | No of pregnant rats out of 10 treated, on 15th day from treatment |
|---|---|---|---|
| Controls | — | — | 10 |
| Norethindrone 3-cyclopentyloxime (anti isomer) | 5 | 1.910 | 0 |
| Norethindrone 3-cyclopentyloxime 17-enanthate | 5 | 2.470 | 1 |
| Norethindrone 3-ethyloxime (syn isomer) | 5 | 1.705 | 0 |
| Norethindrone 3-n.propyloxime (anti isomer) | 5 | 1.775 | 0 |
| Norethindrone 3-n.propyloxime (syn isomer) | 5 | 1.775 | 1 |
| Norethindrone 3-n.butyloxime (anti isomer) | 5 | 1.850 | 1 |
| Norethindrone 3-n. butyloxime (syn isomer) | 5 | 1.850 | 0 |
| Norethindrone 3-n.heptyloxime (anti isomer) | 3 | 2.060 | 0 |
| Norethindrone 3-n.heptyloxime (syn isomer) | 5 | 2.060 | 1 |
| Norethindrone 3-n.nonyloxime (syn isomer) | 5 | 2.200 | 1 |
| Norethindrone 17-acetate 3-acetyloxime | 5 | 1.985 | 5 |

It will be noted from the results of Table III, that the syn isomers of ethyloxime and butyloxime of norethindrone as well as the anti isomers of norethindrone cyclopentyloxime, propyloxime and heptyloxime are particularly active. In fact, none of the female rats treated with a single dose of about 2 mg of the above isomers showed evident signs of pregnancy after 15 days from treatment, while 50% of the animals receiving an equivalent dose of the well-known 3-acetyloxime of norethindrone 17-acetate became normally pregnant during the same period. It is therefore confirmed that the 3-oxime ester has no protracted effect. The new 3-cyclopentyloxime of norethindrone 17-enanthate shows, on the contrary, a prolonged effect which is nearly similar to that of the corresponding alkyloximes of norethindrone free alcohol.

3rd Experiment: The post-coital effect of the compounds of this invention was evaluated on female rats of the Wistar strain weighing about 170 g. The animals were previously mated with male rats and mating was ascertained by finding sperm in the vagina. During a period of between the 34th and the 50th hour after mating, the female rats were divided into homogeneous groups and treated orally with a single equimolar dose of the compounds under examination, while a group of non-treated female rats acted as controls. 12 days after treatment all animals were sacrificed and the uterii were examined in order to evaluate the number of pregnancies and of implantations. The results of this experiment are reported in Table IV.

TABLE IV

| Compound administered orally (in 0.2 ml sesame oil) | Post-coital single dose μmoles | Post-coital single dose mg | No. of pregnant female rats in comparison to treated ones | Average number of implantations |
|---|---|---|---|---|
| Controls | — | — | 9/9 | 10.7±1.1 |
| Norethindrone 3-cyclopentyloxime (anti isomer) | 1 | 0.382 | 0/9 | 0 |
| Norethindrone 3-methyloxime (syn isomer) | 1 | 0.327 | 0/8 | 0 |
| Norethindrone 3-methyloxime (anti isomer) | 1 | 0.327 | 3/8 | 1.9±1.3 |
|  | 2 | 0.654 | 0/8 | 0 |
| Norethindrone 3-proparglyoxime (anti isomer) | 1 | 0.351 | 2/8 | 0.7±0.6 |
|  | 2 | 0.702 | 0/8 | 0 |
| Norethindrone 3-n.pentyloxime | 1 | 0.384 | 2/9 | 0.3±0.2 |
|  | 2 | 0.768 | 0/9 | 0 |
| Norethindrone 17-acetate 3-oxime | 1 | 0.355 | 7/9 | 5.9±1.4 |
|  | 3 | 1.065 | 2/10 | 1.7±1.1 |
|  | 6 | 2.130 | 0/10 | 0 |

It will be noted from the above results that the tested norethindrone alkyloximes are very effective as post-coital contraceptive agents since they succeed in preventing conception and avoiding implantation at low dosages, while the corresponding 3-oxime of norethindrone acetate possesses an equivalent activity only if administered at doses of from 3 to 6 times higher.

4th Experiment: The contraceptive effect of norethindrone 3-cycopentyloxime was also evaluated on male rats in comparison with the corresponding free 3-oxime of norethindrone acetate. The two compounds were daily administered orally to groups of fertile male rats for a 2-weeks period. A week after the beginning of treatment, the male rats were placed in single cages, each of them with a female and allowed to mate. 20 Days later, the females were sacrificed and the contraceptive effect of the compounds on male rats was evaluated on the basis of the number of pregnancies.

The results reported in Table V show that norethindrone 3-cyclopentyloxime does not seriously influence the males' fertility unlike the norethindrone acetate 3-oxime which shows on the contrary an evident anti-fertility effect.

5th Experiment: The 3-cyclopentyloxime was also evaluated for its anti-estral activity in comparison with the 3-oxime of norethindrone acetate by using adult female rats of the Wistar strain showing a regular estral cycle. The compounds were given orally, in a single dose, and the estral cycles of both treated and non-treated animals were carefully observed since the beginning of treatment and observation was continued for a 3-weeks period. The results of such observations are show in Table VI, where regular means an estral cycle up to 6 days, prolonged a cycle lasting up to 10 days and discontinued when the cycle was inhibited for more than 10 days.

It appears that norethindrone 3-cyclopentyloxime completely alters the estral cycle of the treated females causing in 70% of cases complete inhibition for about 3 weeks, while the corresponding free 3-oxime can discontinue the cycle only in 30% of treated cases.

containing up to 5 carbon atoms.

2. A compound according to claim 1 wherein R is methyl.
3. A compound according to claim 1 wherein R is propyl.
4. A compound according to claim 1 wherein R is propargyl.
5. A compound according to claim 1 wherein R is pentyl.
6. A compound according to claim 1 wherein R is cyclopentyl.
7. Anti and syn isomers of norethindrone O-alkyloximes of the formula:

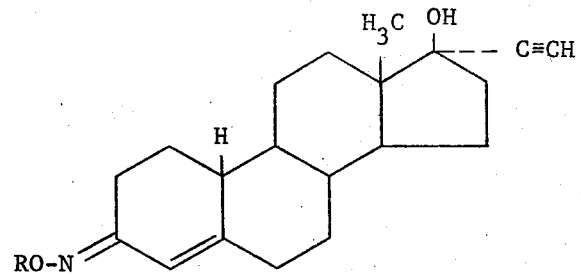

wherein R represents a saturated or mono-unsaturated open-chain aliphatic hydrocarbon radical or a cyclic aliphatic hydrocarbon radical, each of said radicals containing up to 5 carbon atoms.

8. Compounds according to claim 7 wherein R represents a methyl, ethyl, propyl, propargyl, butyl, pentyl, or cyclopentyl radical.

TABLE V

| Compound administered orally (in 0.2 ml sesame oil) | Daily dosage | | Number of fertile male rats in comparison to treated ones |
|---|---|---|---|
| | μmoles | mg | |
| Controls | — | — | 10/10 |
| Norethindrone 3-cyclopentyloxime (anti isomer) | 2 | 0.764 | 10/10 |
| | 10 | 3.82 | 8/10 |
| Norethindrone 17-acetate 3-oxime | 2 | 0.710 | 8/10 |
| | 10 | 3.55 | 3/10 |

TABLE VI

| Compound administered orally (in 0.2 ml sesame oil) | Single dose | | Number of rats with estral cycle | | |
|---|---|---|---|---|---|
| | μmoles | mg | Regular | Prolonged | Discontinued |
| Controls | — | — | 10 | — | — |
| Norethindrone 3-cyclopentyloxime (anti isomer) | 10 | 3.82 | — | 3 | 7 |
| Norethindrone 17-acetate 3-oxime | 10 | 3.55 | 3 | 4 | 3 |

We claim:
1. O-alkyloximes of norethindrone of the formula:

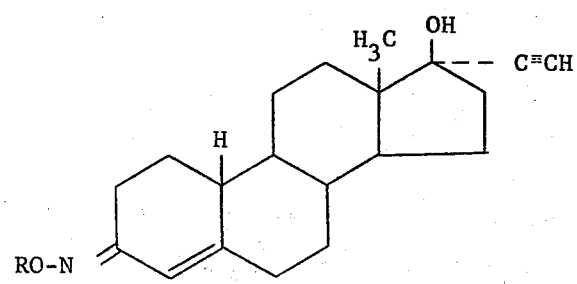

wherein R represents a saturated or mono-unsaturated open-chain aliphatic hydrocarbon radical or a cyclic aliphatic hydrocarbon radical, each of said radicals 9. A compound according to claim 7 which is the anti isomer of norethindrone 3-cyclopentyloxime.
10. A compound according to claim 7 which is the syn isomer of norethindrone 3-cyclopentyloxime.
11. A compound according to claim 7 which is the anti isomer of norethindrone 3-n. propyloxime.
12. A compound according to claim 7 which is the anti isomer of norethindrone 3-propargyloxime.
13. A compound according to claim 7 which is the anti isomer of norethindrone 3-n. pentyloxime.
14. A compound according to claim 7 which is the syn isomer of norethindrone 3-methyloxime.
15. A compound according to claim 7 which is the syn isomer of norethindrone 3-ethyloxime.
16. A compound according to claim 7 which is the syn isomer of norethindrone 3-n. butyloxime.

* * * * *